United States Patent
Anbazhagan et al.

(10) Patent No.: US 12,093,154 B1
(45) Date of Patent: Sep. 17, 2024

(54) REDUCED DUPLICATION STORAGE MANAGEMENT

(71) Applicant: Microsoft Technology Licensing, LLC, Redmond, WA (US)

(72) Inventors: Uma Maheswari Anbazhagan, Redmond, WA (US); Qihong Chen, Portland, OR (US); Mitrabhanu Mohanty, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/300,061

(22) Filed: Apr. 13, 2023

(51) Int. Cl.
*G06F 11/20* (2006.01)

(52) U.S. Cl.
CPC .............................. *G06F 11/2092* (2013.01)

(58) Field of Classification Search
CPC .................................................. G06F 11/2092
See application file for complete search history.

(56) References Cited

U.S. PATENT DOCUMENTS

| | | | | |
|---|---|---|---|---|
| 9,367,405 B1* | 6/2016 | Foley | .................... | G06F 11/142 |
| 2004/0098371 A1* | 5/2004 | Bayliss | ............... | G06F 16/2471 |
| 2004/0153710 A1* | 8/2004 | Fair | .................... | H04L 67/1097 |
| | | | | 714/4.1 |
| 2006/0083102 A1* | 4/2006 | Ghanem | ............. | G06F 11/2074 |
| | | | | 365/232 |
| 2010/0100475 A1* | 4/2010 | Callaway | ............ | G06F 11/1641 |
| | | | | 705/37 |
| 2013/0297970 A1* | 11/2013 | Callaway | ............ | G06F 11/2097 |
| | | | | 714/15 |
| 2016/0077936 A1 | 3/2016 | Tang | | |
| 2020/0183802 A1* | 6/2020 | Rathi | .................. | G06F 11/2094 |
| 2022/0291846 A1* | 9/2022 | Nazari | .................. | G06F 3/0617 |

OTHER PUBLICATIONS

Narkhede, Neha, "Kafka Replication", Retrieved From: https://cwiki.apache.org/confluence/display/kafka/kafka+replication, Feb. 2, 2013, 5 Pages.

(Continued)

*Primary Examiner* — Matthew M Kim
*Assistant Examiner* — Matthew N Putaraksa
(74) *Attorney, Agent, or Firm* — Holzer Patel Drennan

(57) ABSTRACT

Management of access to stored data in a storage system is provided, including assignment of a first storage processor as a leader storage processor and a second storage processor as a follower storage processor. The leader storage processor is configured to manage data storage operations on a predefined memory portion of the storage system, and the follower storage processor is configured to manage data storage operations in response to a failure of the leader storage processor. The management further includes detecting failure of the first storage processor that interrupts the management of the data storage operations, assigning, responsive to the detection of the failure, the second storage processor as a new leader storage processor configured to resume the management of the operations, and assigning a third storage processor as a new follower processor configured to manage the data storage operations on the predefined memory portion.

19 Claims, 5 Drawing Sheets

(56) References Cited

OTHER PUBLICATIONS

Narkhede, Neha, "Kafka Replication Detailed Design V2", Retrieved From: https://cwiki.apache.org/confluence/display/KAFKA/Kafka+replication+detailed+design+V2, Apr. 11, 2012, 13 Pages.
Rao, Jun, "Kafka Detailed Replication Design V3", Retrieved From: https://cwiki.apache.org/confluence/display/KAFKA/kafka+Detailed+Replication+Design+V3, Oct. 16, 2012, 10 Pages.
"Introduction", Retrieved From: https://kafka.apache.org/intro, Retrieved Date: Jan. 4, 2023, 5 Pages.
Nikhil, Alok, "Confluentinc/Openmessaging-Benchmark", Retrieved From: https://github.com/confluentinc/ppenmessaging-benchmark/blob/master/driver-kafka/kafka-group-all.yaml, Aug. 20, 2020, 2 Pages.
"Apache Kafka," Rederived from internet URL: —http://web.archive.org/web/20150927133454/http://kafka.apache.org/documentation.html#introduction, Sep. 27, 2015, 33 Pages.
International Search Report and Written Opinion received for PCT Application No. PCT/US2024/022903, Jul. 4, 2024, 16 pages.
Paraiso, et al., "soCloud: a service-oriented component-based PaaS for managing portability, provisioning, elasticity, and high availability across multiple clouds," Computing 98, vol. 98, Issue No. 5, Aug. 13, 2014, pp. 539-565.

\* cited by examiner

REDUCED DUPLICATION STORAGE MANAGEMENT

BACKGROUND

Some storage management systems achieve data resiliency by maintaining duplicates of stored data. Storage operations are typically handled by a storage processor that reads, writes, and manages data within the storage management system. If a storage processor managing data storage for a predefined memory portion fails, any lost or corrupted data for that memory portion can be recovered from a duplicate of that stored data.

SUMMARY

The presently disclosed technology provides management of access to stored data in a storage system by assignment of a first storage processor as a leader storage processor and a second storage processor as a follower storage processor, wherein the leader storage processor is configured to manage data storage operations on a predefined memory portion of the storage system, and the follower storage processor is configured to manage data storage operations in response to a failure of the leader storage processor. The management further includes the detection of failure of the first storage processor that interrupts the management of the data storage operations, assignment, responsive to the detection of the failure, of the second storage processor as a new leader storage processor configured to resume the management of the operations, and assignment of a third storage processor as a new follower processor configured to manage the data storage operations on the predefined memory portion.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Figure 1:
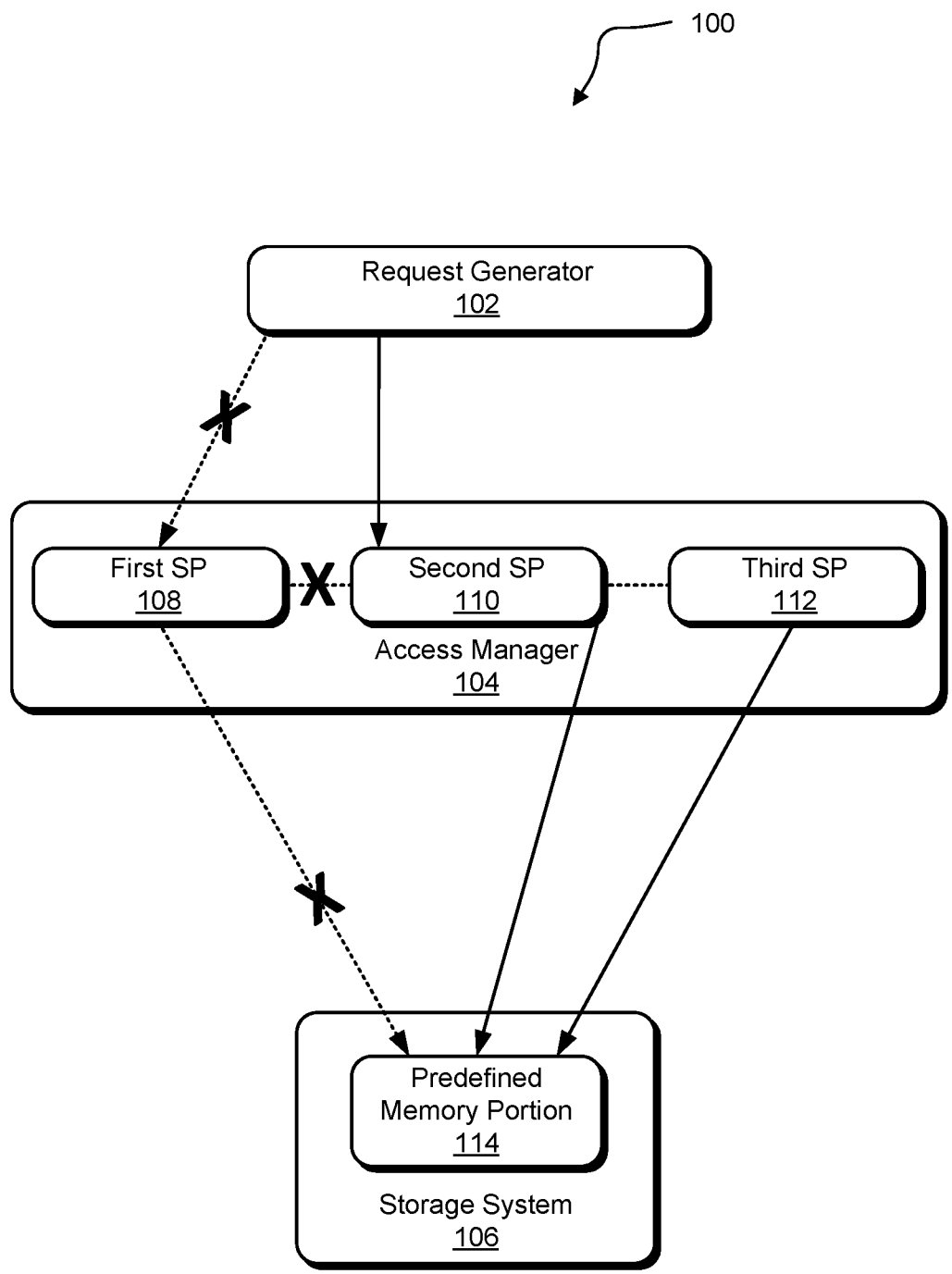
FIG. 1 illustrates a system for managing access to stored data.

In some computing environments, a cluster of storage processors (e.g., storage brokers) is assigned to manage storage operations on predefined memory portions of a storage system, such as a cloud storage system. The storage processors may be independent processing units that may be or include, without limitation, virtual machines (e.g., Java virtual machines or other virtual machines), brokers (e.g., Apache Kafka brokers or other brokers), dedicated processing hardware, microprocessors, or processing cores. The storage operations satisfy requests from requesting entities, such as publishers and subscribers, that are directed to particular predefined memory portions. For any predefined memory portion, the cluster assigns a leader storage processor to actively manage storage operations on a first copy of data in the predefined memory portion. The cluster assigns one or more follower storage processors to assume management of storage operations on the predefined memory portion if the leader storage processor fails. The cluster may assign the one or more follower storage processors one or more other copies of the first copy of data upon which to operate.

The storage system can prevent data loss by generating duplicates of data stored in the storage system. One faculty for mitigating data loss is a processing duplicate maintained in the event of a storage processor failure. The processing duplicates are copies of data within a predefined memory portion (e.g., a topic or partition) that are connected (e.g., by directory reference) to the storage processors assigned to the predefined memory portion. When a leader storage processor for a predefined memory portion fails, a functional follower storage processor available at the time of the failure can operate on the processing duplicate (e.g., copy of data) or can take over processing on the original processing duplicate in order to maintain continuity in processing with limited data loss. This arrangement limits the number of processing duplicates that are maintained while still ensuring data resiliency. The processing duplicates may include the data copies described in this specification. The processing duplicates are distinct from a second faculty for mitigating data loss (e.g., a storage duplicate) that the storage layer maintains to restore data in the event of a failure of a memory sector. Storage duplicates may be presented as only one example instance of the data in an interface with the cluster of the storage processors.

Storage processors may be assigned responsibilities for predefined portions of memory. The assignments may be made by placing a copy of data, a reduced copy of data, a link, a reference, an address, or a pointer to the predefined memory portion or copies of data therein in a subdirectory specific to a particular storage processor. As described herein, the assignments can establish connections between the storage processors and the predefined memory portion and/or a data copy or reduced data copy stored thereon. In implementations, the storage processor may be restricted to only write to or read from elements in or referenced in a sub-directory unique to the storage processor. The leader storage processor is configured to manage storage or data operations (e.g., reads or writes) on a particular predefined memory portion to which the leader storage processor is assigned. The follower storage processor is configured to manage the storage operations on the predefined memory portion in the event of a failure of the leader storage processor. If the leader storage processor fails, the follower storage processor becomes the leader processor, and a new follower storage processor is assigned for the predefined memory portion. In some systems, a finite number of follower storage processors are assigned initially when the storage processors of the cluster are mounted to the storage system (e.g., mounted to a file share) as leader and follower storage processors, and the entire predefined storage portion can become inaccessible for data operations if all of the follower storage processors fail. In these systems, a data copy may be maintained for each of the storage processors assigned, creating a significant amount of storage overhead. Providing dynamic assignment of new follower storage processors to the predefined memory portion allows for fewer copies of data to be maintained and assigned.

An approach to ensuring processing resiliency in the event of a failure of a first storage processor, such as a broker, is to provide a processing resilience duplicate of the data on which a second storage processor is assigned to operate. One approach to ensuring that a failure of the second storage processor does not cause irreparable harm to data is to create a second copy of the data and assign management of operations on the second copy to a third storage processor. If this is done at the time of the creation of the data, this would mean carrying three processing resilience duplicates of the same data at one time, for which the storage system may further generate storage resiliency duplicates. This can occupy greater storage resources than is necessary for processing resiliency. Alternatively, if the second duplicate and assignment to the third storage processor are made on-demand upon a failure event of the first storage processor, it may cause a copying operation to make a second duplicate of the data that can take time and occupy bandwidth. This can occupy greater processing and networking resources than a threshold level to ensure processing resiliency.

The presently disclosed technology provides processing resiliency with fewer processing resiliency duplicates of data in storage and fewer data units assigned to the portion of storage with the duplicates of data. In implementations, a first storage processor, a second storage processor, and a third storage processor are mounted to a storage system. Prior to a failure of the first storage processor, the first storage processor is assigned as a leader storage processor (e.g., a leader broker) configured to process data operations on a predefined memory portion of a storage system, and the second storage processor is assigned as a follower storage processor (e.g., a follower broker) configured to process the data operations on the predefined memory portion in the event of a failure of the leader storage processor. In the event of a failure of the first storage processor, the second storage processor is assigned as the leader storage processor, and the third storage processor is newly assigned as a follower storage processor for the predefined memory portion and is newly connected to the predefined memory portion that was assigned to the former leader storage processor. Implementations of processing resiliency schemes include a full copy processing resilience scheme and a reduced copy processing resilience scheme.

In a full copy processing resiliency scheme, the predefined portion of storage stores a first copy of data to which the first storage processor is assigned as a leader storage processor and a second copy of data to which the second storage processor is assigned as a follower storage processor. Upon a failure of the first storage processor, a third storage processor is assigned as a follower storage processor and connected to the first copy of the data to which the failed first storage processor was connected prior to the failure. Responsive to the failure of the first storage processor, the second storage processor is designated the leader storage processor and operates on the second copy of data to which the second storage processor was already connected prior to the detected failure. In so doing, the system provides the third unit, as a follower storage processor, a complete copy of the data without any further copying because the first copy of the data originally assigned to the first storage processor is maintained in storage and assigned to the third storage processor. This can provide a substantially seamless transition to the second storage processor as the new leader storage processor while maintaining processing resiliency without adding duplicates or copy operations.

In a reduced copy processing resilience scheme, the predefined portion of storage stores a first copy of data to which the first storage processor is connected as a leader storage processor and a reduced copy of data to which the second storage processor is connected as a follower storage processor. The reduced copy of the data is data representing a predefined number of recent data processing operations conducted on and/or recent modifications to the first copy of data. The reduced copy of the data occupies less storage than a full copy of the first copy of the data but provides the most recent data likely to have been compromised by the failure of the first storage processor. Upon a failure of the first storage processor, the second storage processor is assigned as a follower storage processor but is connected to the reduced copy of data or is assigned to a new memory portion configured to begin a new reduced copy of data for the predefined portion of storage. Responsive to the failure of the first storage processor, the second storage processor is designated the leader storage processor. The second storage processor is connected to the first copy of data and processes operations as the leader storage processor on the first copy of the data. In an implementation, the second storage processor reconciles the reduced copy of the data with the first copy of the data to ensure that data from processing operations is not lost due to the failure prior to the second storage processor operating on the first copy of data. In so doing, the system provides processing resilience while maintaining only one complete processing resiliency copy, the first copy of the data. This maintains processing resiliency, occupies limited storage in the storage system, and eliminates the need for generating a complete duplicate of the first copy of data for processing resiliency.

FIG. 1 illustrates a system 100 for managing access to stored data. A request generator 102 in the system 100 generates requests to operate on data stored in a storage system 106. The request is managed by storage processors (e.g., brokers) in an access manager 104. In an implementation, a first storage processor 108 is assigned as a leader storage processor assigned to perform data operations on a predefined memory portion 114 in the storage system 106. A leader storage processor may be uniquely assigned as a leader storage processor for the predefined memory portion 114. The second storage processor 110 is assigned as a follower storage processor configured to process the data operations on the predefined memory portion 114 in the event of a failure of the first storage processor 108. In an implementation, a leader storage processor may be uniquely assigned as a leader storage processor, and/or a follower storage processor may be uniquely assigned as a follower storage processor for a predefined memory portion 114. The storage system 106 can have its memory divided into any number of predefined memory portions, each of which may be assigned a leader storage processor and one or more follower storage processors.

Upon failure of the first storage processor 108, as illustrated in FIG. 1, a controller storage processor of the access manager may assign the second storage processor 110 as a new leader storage processor for processing data operations for the predefined memory portion 114. The controller storage processor may further assign a third storage processor 112 as a new follower storage processor to the predefined memory portion 114. The third storage processor 112 may not have been connected to the predefined memory portion 114 prior to the failure of the first storage processor 108, and the failure may trigger the connection of the third storage processor to the predefined memory portion 114. While the first storage processor 108, the second storage processor 110, and/or the third storage processor 112 may have been mounted to the storage system 106, the establishment of the connection of the third storage processor 112 to the predefined memory portion 114 can place the third storage processor 112 as a follower storage processor in line to assume management operations on the predefined memory portion 114 as the leader storage processor. In an implementation, the connections between a storage processor and a predefined memory portion can be based on a directory allocated for the storage processor into which a copy of data, a reduced copy of data, or an indirection reference (e.g., a pointer, address, or link) to either can be stored. A connection between a storage processor and a predefined memory portion or portion of data can enable the storage processor to operate on the predefined memory portion as a leader storage processor or a follower storage processor. The directory for each storage processor can include copies of data for which the storage processor is a leader storage processor or a follower storage processor.

A controller storage processor may determine and track whether data in a storage processor's directory refers to data for which the storage processor is a leader storage processor or a follower storage processor. As illustrated, the second storage processor 110 becomes the new leader storage processor, the third storage processor becomes the new follower storage processor, and the first storage processor's connection is ignored or removed. In implementations, if the first storage processor 108 becomes available again, the controller storage processor can reassign the first storage processor 108 as the leader storage processor position for the predefined memory portion 114, the second storage processor 110 as the follower storage processor, and/or can remove or maintain the third processor unit as a follower storage processor for the predefined memory portion 114. In implementations, migration of responsibility for a predefined memory portion and/or a data copy or reduced data copy stored therein can be conducted without duplication of the data copy or reduced data copy.

In implementations, the controller storage processor is configured to modify descriptive data (e.g., metadata) associated in memory with a storage processor to indicate that the storage processor is a leader storage processor or a follower storage processor assigned to a particular predefined data unit. When a leader storage processor fails, the controller storage processor may modify data associated with a former follower storage processor turned leader storage processor to establish that the storage processor becomes a leader storage processor for a specified predefined memory portion. The controller storage processor may further add a predefined data portion or data stored therein (e.g., a copy of the data or a reduced copy of the data) to the directory of a newly assigned follower storage processor and modify descriptive data associated with the newly assigned follower storage processor to indicate that the newly assigned follower storage processor is a follower storage processor for the predefined data portion.

In an implementation, the access manager may store in cache (e.g., page cache) recent operations on or modifications to data for each of the storage processors. For example, the first storage processor 108 may be associated with a cache in the local memory of the first storage processor 108. If the first storage processor 108 fails, the second storage processor 110, as the newly assigned leader storage processor, may reconcile its local cache with the data stored in the predefined memory portion 114 to update the data in the predefined memory portion 114 to ensure that no data was lost from processing operations by the first storage processor 108 when the first storage processor 108 failed.

Storage processors, as used herein, may refer to independent processing units. The processing units, including the first storage processor 108, the second storage processor 110, and the third storage processor 112, may be or include containers, virtual machines (e.g., Java virtual machines), brokers (e.g., Apache Kafka brokers), dedicated processing hardware, microprocessors, processing cores, and the like. The processing units may be elements of a processing cluster (e.g., an Apache Kafka cluster). Implementations are contemplated in which the request generator 102 is a producer or a consumer in a Kafka system. The storage system 106 may be a cloud storage system and/or a server system with one or more storage drives. The predefined memory portion 114 may be or include a topic, a partition, a volume, a full drive, a disk, a platter, or a predefined portion thereof within the storage system 106.

In implementations, the controller storage processor communicates with a management support system (e.g., an Apache Zookeeper) to coordinate operations. An example operation of the controller storage processor is replica migration which moves a data copy in a predefined memory portion from one storage processor to another storage processor (e.g., by moving data or links between sub-directories associated with the source and destination storage processors). Replica (e.g., data copy) migration may include the controller taking the source data copy and predefined data portion offline, instructing the source storage processor to unload the data copy, removing the source storage processor from assignment to the data copy (e.g., by updating the assignment in the controller storage processor and the system and/or by notifying the other live storage processors), instructing the destination storage processor to migrate the data copy (e.g., by moving the replica log directory and loading the log from the source storage processor data), adding the destination storage processor to the data copy assignment (which may update the assignment in both the controller storage processor and/or the management support system), taking the new data portion and partition online, and removing the old data portion.

Another example operation of the controller storage processor is replica auto-failover, which itself includes three separable operations. The first operation is storage processor down detection, in which the controller storage processor detects that a storage processor is no longer communicating (e.g., in the form of a path being removed by a monitor). Alternatively, the controller itself may fail, causing the management support system (e.g., an Apache Zookeeper) to notify other or all of the other storage processors to initiate the promotion of another storage processor to be the controller storage processor. When the storage processor down is detected, the controller storage processor may wait a predefined period and then continue to the next operation if the called storage processor is still determined to be down. In the next operation, the controller may plan the migration of the responsibility for the predefined data portion. The controller storage processor can use the management support system to determine which storage processors are leader storage processors and which are follower storage processors for the predefined data portions in the storage system. The planning may include load balancing to ensure a substantially even operation load between storage processors (e.g., accounting for the amount of data and how often the data is operated upon). When the migration is planned, the controller storage processor may execute the migration. The execution may be done in parts in order to ensure the continued operation of the storage processors during the migration. In the event that a migration fails, the controller storage processor can restore the remaining storage processors to a state prior to the attempted migration. Any migration may include moving a replica of a log directory of storage processors maintained by the system.

Figure 2:
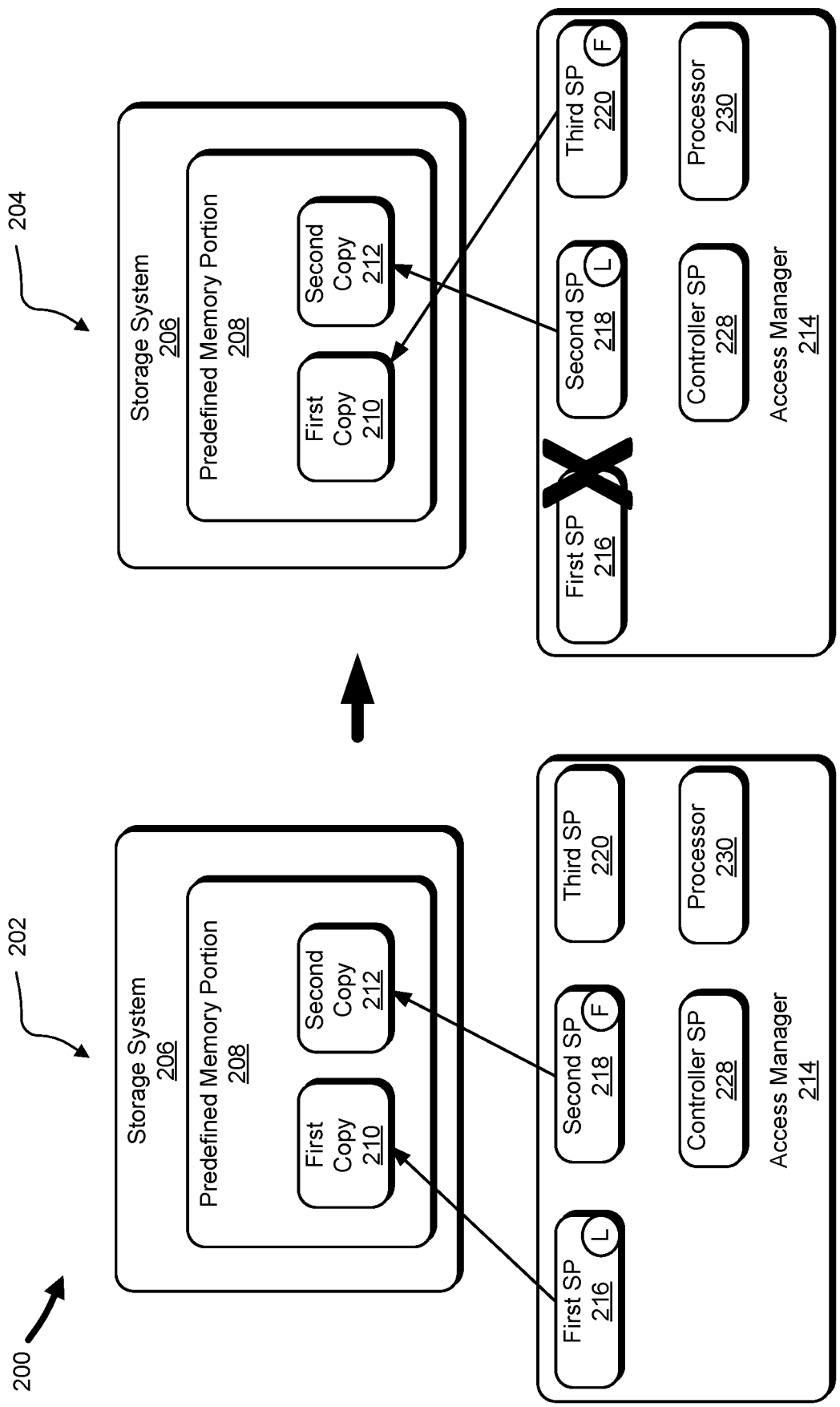
FIG. 2 illustrates an example system for managing access to stored data that uses a full copy processing resiliency scheme.

A full copy processing resiliency scheme implementation is illustrated in and described with respect to FIG. 2. A reduced copy processing resiliency scheme implementation is illustrated in and described with respect to FIG. 3.

FIG. 2 illustrates an example system 200 for managing access to stored data that uses a full copy processing resiliency scheme. The system 200 includes an access manager 214 and a storage system 206, including a predefined memory portion 208. The predefined memory portion 208 is a predefined division of the memory (e.g., a partition, volume, or topic) available for storing data in the storage system 206. The system 200 may further include a controller storage processor 228 for managing the operations of processing units. In a first state 202 of the full copy processing resiliency scheme, the predefined memory portion 208 stores a first copy 210 of data (e.g., a portion of data) to which the first storage processor 216 is assigned as a leader storage processor (illustrated as an "L" button) and a second copy 212 of data to which the second storage processor 218 is assigned as a follower storage processor (illustrated as an "F" button).

Upon a failure of the first storage processor 216, the system 200 transitions from the first state 202 to a second state 204 of the full copy processing resiliency scheme. In the second state 204, the controller storage processor 228 assigns a third storage processor 220 as a new follower storage processor and connects the third storage processor 220 to the first copy 210 of the data. Responsive to the failure of the first storage processor 216, the controller storage processor assigns the second storage processor 218 as a new leader storage processor configured to operate on the second copy 212 of data to which the second storage processor 218 was already connected prior to the detected failure. In so doing, the system 200 provides the third storage processor 220, as a follower storage processor, a complete copy of the data without any further copying because the first copy 210 of the data originally assigned to the first storage processor 216 is maintained in the predefined memory portion 208, and the controller storage processor 228 connects the first copy 210 of the data to the third storage processor 220. This can provide a substantially seamless transition to the second storage processor 218 as the leader storage processor without additional duplicates or copy operations.

Although not illustrated, the system 200 may further store the cache of the first storage processor 216 and reconcile (e.g., by the second storage processor 218, the controller storage processor 228, or another portion of the system 200) the cache with the first copy 210 and/or the second copy 212 to ensure that all data operations up until the failure of the first storage processor 216 are accounted for before the second storage processor 218 proceeds to operate as a new leader storage processor of the predefined memory portion 208 on the second copy 212. The system may further include a processor 230 (e.g., a hardware processor) configured to execute the storage processors. Implementations are also contemplated in which the storage processors are independent hardware processor elements.

Figure 3:
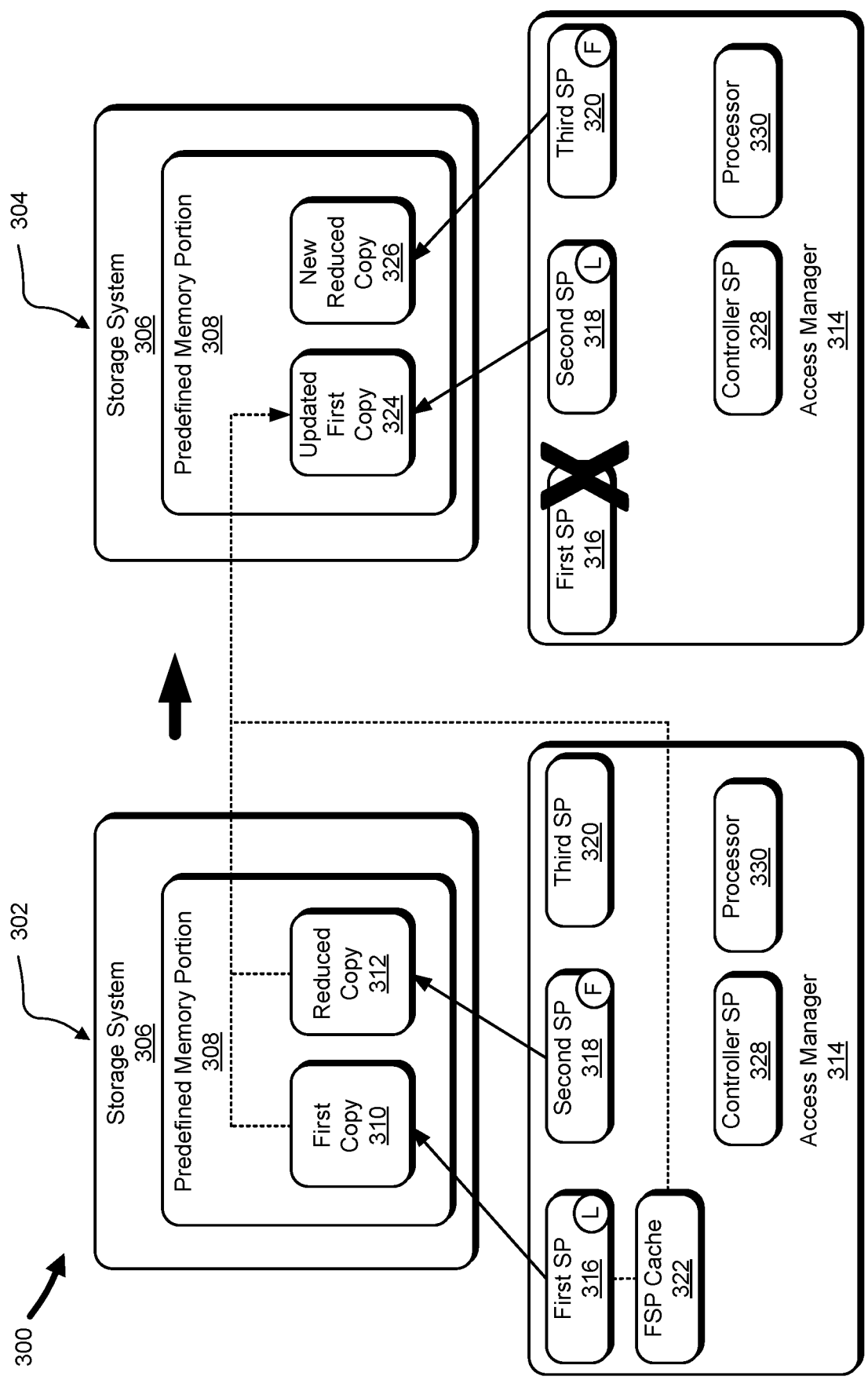
FIG. 3 illustrates an example system for managing access to stored data that uses a reduced copy processing resiliency scheme.

FIG. 3 illustrates an example system 300 for managing access to stored data that uses a reduced copy processing resiliency scheme. The system 300 includes an access manager 314 and a storage system 306, including a predefined memory portion 308. The system 300 may further include a controller storage processor 328 for managing the operations of processing units. In a first state 302 of a reduced copy processing resilience scheme, a predefined memory portion 308 stores a first copy 310 of data (e.g., a portion of data) to which a first storage processor 316 is connected as a leader storage processor and a reduced copy 312 of data (e.g., recent operation data) to which a second storage processor 318 is connected as a follower storage processor. The reduced copy 312 of the data is data representing a predefined quantity or portion of recent data processing operations conducted on and/or of recent modifications to the first copy 310 of data. The reduced copy 312 of the data occupies less storage than a full copy of the first copy 310 of the data but provides the most recent data likely to have been compromised by a failure of the first storage processor 316.

Upon a failure of the first storage processor 316, the system 300 transitions from the first state 302 to a second state 304. In the second state 304, the controller storage processor 328 assigns a third storage processor 320 as a follower storage processor but connects the third storage processor 320 to a new reduced copy 326 of data for the predefined memory portion 308 (as illustrated) or to the reduced copy 312 of data (not illustrated) that existed prior to the failure of the first storage processor 316. The new reduced copy 326 may be an empty data set configured to begin receiving data representing a predefined number of recent data processing operations conducted on and/or of recent modifications to an updated first copy 324 of the data. Responsive to the failure of the first storage processor 316, the controller storage processor 328 assigns the second storage processor 318 as a leader storage processor of the predefined memory portion 208 and connects the second storage processor 318 to the updated first copy 324 of the data to process operations as the leader storage processor of the updated first copy 324 of the data and/or the predefined memory portion 308.

In implementations, the second storage processor 318 is configured to reconcile the first copy 310 with the reduced copy 312 (e.g., by comparing an operation counter) and/or with the first processor unit cache 322 to generate the updated first copy 324 (illustrated by dashed lines) to include any data processed by the first storage processor 316 before the failure. The reconciliation can ensure that data from processing operations of the first storage processor 316 is not lost due to the failure prior to the second storage processor 318 operating on the updated first copy 324 of the data. In so doing, the system 300 provides processing resilience while maintaining only one complete processing resiliency instance of the first copy 310 of the data that is reconciled to become the updated first copy 324 of the data. The system 300 maintains processing resiliency, occupies limited storage in the storage system 306, and eliminates the need for generating a complete duplicate of the first copy 310 of data for the third storage processor 320 to maintain processing resiliency. The system may further include a processor 330 (e.g., a hardware processor) configured to execute the storage processors. Implementations are also contemplated in which the storage processors are independent hardware processor elements.

Figure 4:
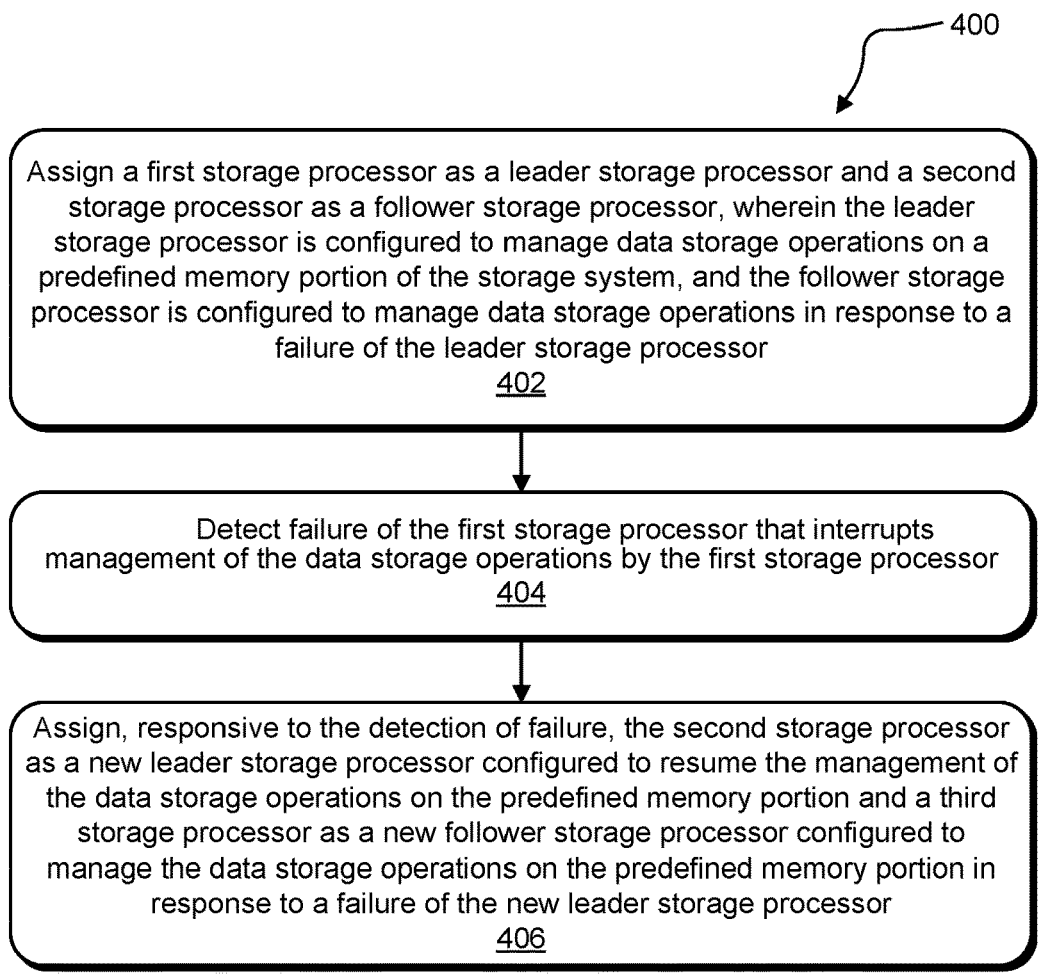
FIG. 4 illustrates example operations for managing access to stored data.

FIG. 4 illustrates example operations 400 for managing access to stored data.

An assigning operation 402 assigns a first storage processor as a leader storage processor and a second storage processor as a follower storage processor. A leader storage processor is configured to manage data storage operations on a predefined memory portion of the storage system, and a follower storage processor is configured to manage data storage operations in response to a failure of the leader storage processor. In implementations, the first storage processor, the second storage processor, and/or a third storage processor are mounted to the storage system.

A detecting operation 404 detects a failure of the first storage processor that interrupts the management of the data storage operations by the first storage processor. The third storage processor is neither connected nor assigned to the predefined memory portion prior to the detecting operation.

An assigning operation 406 assigns, responsive to the detection of the failure, the second storage processor as a new leader storage processor configured to resume the management of the operations on the predefined memory portion and a third storage processor as a new follower processor configured to manage the data storage operations on the predefined memory portion. The assigning operation 406 assigns the third storage processor as a new follower storage processor by connecting the third storage processor to the predefined memory portion. The follower storage processor is configured to process the data operations on the predefined memory portion in the event of a failure of the second storage processor (e.g., as the new leader storage processor).

In implementations, the operations 400 can be conducted under a full copy processing resiliency scheme or a reduced copy processing resiliency scheme. Under a full copy processing resiliency scheme, prior to the detecting operation 404, in a first state of the full copy processing resiliency scheme, the predefined memory portion stores a first copy of data (e.g., a portion of data) to which the first storage processor is assigned as a leader storage processor and a second copy of data to which the second storage processor is assigned as a follower storage processor.

The detecting operation 404 transitions the system from the first state to a second state of the full copy processing resiliency scheme. In the second state, the assigning operation 406 assigns the third storage processor as a new follower storage processor and connects the third storage processor to the first copy of the data. In an implementation, responsive to detecting operation 404, the leader assignment operation assigns the second storage processor as the leader storage processor configured to operate on the second copy of data to which the second storage processor was already connected prior to the detecting operation 404. In so doing, the assigning operation 406 provides the third storage processor, as a new follower storage processor, a complete copy of the data without any further copying because the first copy of the data originally assigned to the first storage processor is maintained in the predefined memory portion, and the controller storage processor connects the first copy of the data to the third storage processor. In an implementation, the operations 400 may further include a reconciling operation (not illustrated) that reconciles (e.g., by the second storage processor, the controller storage processor, or another portion of the system) cache from the first storage processor with the first copy and/or the second copy to ensure that all data operations up until the failure of the first storage processor are accounted for before the second storage processor proceeds to operate as the new leader storage processor of the predefined memory portion on the second copy.

In an implementation, the operations 400 can alternatively be conducted under a reduced copy processing resiliency scheme. Under the reduced copy processing resiliency scheme, the assigning operation 402 configures the storage management system in a first state in which a predefined memory portion stores a first copy of data (e.g., a portion of data) to which a first storage processor is connected as a leader storage processor and a reduced copy of data (e.g., recent operation data) to which a second storage processor is connected as a follower storage processor.

The detecting operation 404 transitions the system from the first state to a second state. In the second state, the assigning operation 406 assigns a third storage processor as a new follower storage processor but connects the third storage processor to a new reduced copy of data for the predefined memory portion or to the existing reduced copy of data. In an implementation, in response to the detecting operation 404, the assigning operation 406 assigns the second storage processor as a new leader storage processor of the predefined memory portion and connects the second storage processor to the updated first copy of the data to process operations as the leader storage processor of the updated first copy of the data and/or the predefined memory portion.

In implementations, a reconciling operation (not illustrated) reconciles (e.g., using the second storage processor) the first copy with the reduced copy (e.g., by comparing an operation counter) and/or with a first processor unit cache to generate the updated first copy to include any data processed by the first storage processor before the detecting operation 404.

Figure 5:
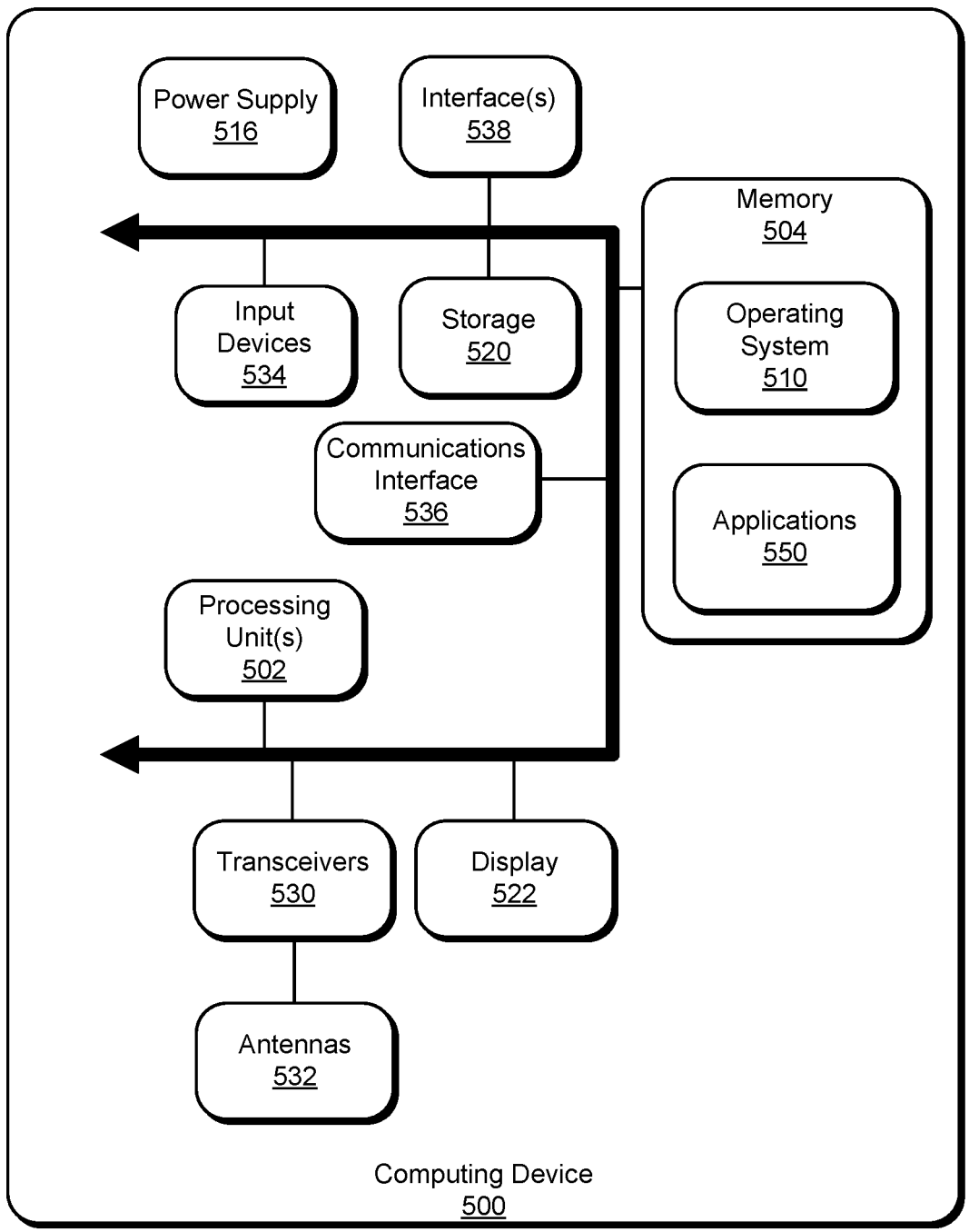
FIG. 5 illustrates an example computing device for use in implementing the described technology.

FIG. 5 illustrates an example computing device 500 for use in implementing the described technology. The computing device 500 may be a client computing device (such as a laptop computer, a desktop computer, or a tablet computer), a server/cloud computing device, an Internet-of-Things (IoT), any other type of computing device, or a combination of these options. The computing device 500 includes one or more processing unit(s) 502 (e.g., hardware or virtual processors running on hardware) and a memory 504. The memory 504 generally includes both volatile memory (e.g., RAM) and nonvolatile memory (e.g., flash memory), although one or the other type of memory may be omitted. An operating system 510 resides in the memory 504 and is executed by the processing unit(s) 502. In some implementations, the computing device 500 includes and/or is communicatively coupled to storage 520.

In the example computing device 500, as shown in FIG. 5, one or more modules or segments, such as applications 550, a storage processor, a controller storage processor, a leader storage processor, a follower storage processor, an access manager, a request generator, a producer, a requestor, a storage system, a virtual machine, a broker, storage management operations, data management operations, a management support system, and other program code and modules are loaded into the operating system 510 on the memory 504 and/or the storage 520 and executed by the processing unit(s) 502. The storage 520 may store a predefined portion of data, a data copy, a reduced copy of data, an updated copy of data, a new reduced copy of data, storage processor cache, a request, and other data and be local to the computing device 500 or may be remote and communicatively connected to the computing device 500. In particular, in one implementation, components of a system for managing access to stored data, including a first storage processor assigned as a leader storage processor configured to manage data operations on a predefined memory portion of a storage system, a second storage processor assigned as a follower storage processor configured to resume management of the data operations in the event of a failure of the first storage processor, and a controller storage processor executable by the one or more hardware processing units and configured to detect a failure of a first storage processor to execute operations as the leader storage processor and assign, responsive to the detected failure, the second storage processor as a follower storage processor configured to process the data operations on the predefined memory portion in the event of a failure of the leader storage processor by connecting the second storage processor to the predefined memory portion may be implemented entirely in hardware or in a combination of hardware circuitry and software.

The computing device 500 includes a power supply 516, which may include or be connected to one or more batteries or other power sources, and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers, client devices, IoT devices, and other computing and communications devices. The computing device 500 may further include a communications interface 536 (such as a network adapter or an I/O port, which are types of communication devices). The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard, trackpad, or mouse). These and other input devices may be coupled to the server by one or more interfaces 538, such as a serial port interface, parallel port, or universal serial bus (USB). Other interfaces may include a sensor or an actuator. The actuator may be configured to move responsive to the sensors (e.g., in a feedback loop) and may be used to execute any operations described herein. The computing device 500 may further include a display 522, such as a touchscreen display.

The computing device 500 may include a variety of tangible processor-readable storage media and intangible processor-readable communication signals. Tangible processor-readable storage can be embodied by any available media that can be accessed by the computing device 500 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes but is not limited to RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. An example method for managing access to stored data in a storage system is provided, comprising: assigning a first storage processor as a leader storage processor and a second storage processor as a follower storage processor, wherein the leader storage processor is configured to manage data storage operations on a predefined memory portion of the storage system, and the follower storage processor is configured to manage data storage operations in response to a failure of the leader storage processor; detecting a failure of the first storage processor that interrupts management of the data storage operations by the first storage processor, wherein, prior to the detection of the failure, the predefined memory portion includes a first copy of data to which the first storage processor is connected and a second copy of data to which the second storage processor is connected, the second copy of data generated as a processing resilience duplicate of the first copy of data; and assigning, responsive to detection of the failure, the second storage processor as a new leader storage processor configured to resume the management of the data storage operations on the predefined memory portion and a third storage processor as a new follower storage processor configured to manage the data storage operations on the predefined memory portion in response to a failure of the new leader storage processor.

Clause 2. The method for managing access to stored data of clause 1, wherein, responsive to the detection of the failure, connection between the second storage processor and the second copy of data is maintained to enable the second storage processor to process operations on the second copy of data.

Clause 3. The method for managing access to stored data of clause 1, wherein the operation of assigning the third storage processor as a new follower storage processor includes connecting the third storage processor to the predefined memory portion.

Clause 4. The method for managing access to stored data of clause 3, wherein the operation of connecting the third storage processor to the predefined memory portion comprises: connecting the third storage processor to the first copy of data to enable the third storage processor to operate as the new follower storage processor with respect to the first copy of data by adding a reference directed to the first copy of data to a directory associated with the third storage processor.

Clause 5. The method for managing access to stored data of clause 1, wherein the operation of assigning the third storage processor as the new follower storage processor further comprises: modifying descriptive data associated in memory with the third storage processor to represent that the third storage processor is the new follower storage processor.

Clause 6. The method for managing access to stored data of clause 1, wherein the first storage processor, the second storage processor, and the third storage processor are elements of a cluster and are mounted to the storage system.

Clause 7. The method for managing access to stored data of clause 6, wherein no element of the cluster instructs the storage system to generate a complete processing resilience duplicate of data stored in the predefined memory portion based on the detection of the failure.

Clause 8. An example system for managing access to stored data in a storage system is provided, comprising: one or more hardware processing units; a first storage processor executable by the one or more hardware processing units and assigned as a leader storage processor configured to manage data storage operations on a predefined memory portion of the storage system; a second storage processor executable by the one or more hardware processing units and assigned as a follower storage processor configured to resume management of data storage operations on the predefined memory portion in response to failure of the leader storage processor; a third storage processor executable by the one or more hardware processing units, wherein the second storage processor and the third storage processor are mounted to the storage system; and a controller storage processor executable by the one or more hardware processing units and configured to: detect a failure of a first storage processor that interrupts management of data storage operations by the first storage processor; assign, responsive to detection of the failure, the second storage processor as a new leader storage processor configured to resume the management of data storage operations on the predefined memory portion; and assign the third storage processor as a new follower processor to manage the data storage operations on the predefined memory portion in response to a failure of the new leader storage processor, wherein assignment of the third storage processor as a new follower storage processor includes connecting the third storage processor to the predefined memory portion.

Clause 9. The system for managing access to stored data in a storage system of clause 8, wherein, prior to the detection of the failure, the predefined memory portion comprises: a portion of data to which the first storage processor is connected; and recent operation data representing a predefined portion of recent operations associated with the portion of data, the recent operation data connected to the second storage processor.

Clause 10. The system for managing access to stored data in a storage system of clause 9, wherein the controller storage processor is further configured to reconcile the portion of data with the recent operation data.

Clause 11. The system for managing access to stored data in a storage system of clause 9, wherein the controller storage processor is further configured to instruct the third storage processor to connect with new recent operation data stored in the predefined portion of memory, the new recent operation data representing the predefined portion of new recent operations associated with the portion of data generated by the second storage processor after the detection of the failure.

Clause 12. The system for managing access to stored data in a storage system of clause 8, wherein the first storage processor, the second storage processor, and the third storage processor are elements of a processing cluster.

Clause 13. The system for managing access to stored data in a storage system of clause 12, wherein no element of the processing cluster is configured to instruct the storage system to generate a further processing resilience duplicate of data stored in the predefined memory portion in response to the detection of the failure.

Clause 14. The system for managing access to stored data in a storage system of clause 8, wherein the controller storage processor is configured to assign the third storage processor as the new follower storage processor by at least modifying descriptive data associated with the third storage processor to represent an assignment of the third storage processor as the new follower storage processor of the predefined memory portion.

Clause 15. One or more example tangible processor-readable storage media embodied with instructions for executing on one or more processors and circuits of a computing device a process for managing access to stored data are provided, the process comprising: detecting a failure of a first storage processor assigned as a leader storage processor configured to manage data operations on a predefined memory portion of a storage system; assigning, based on detection of the failure, a second storage processor as the leader storage processor, wherein the second storage processor was assigned as a follower storage processor connected to the predefined memory portion prior to the detection of the failure; and assigning, based on the detection of the failure, a third storage processor as the follower storage processor by connecting the third storage processor to the predefined memory portion.

Clause 16. The one or more tangible processor-readable storage media of clause 15, wherein the second storage processor, and the third storage processor are mounted to the storage system.

Clause 17. The one or more tangible processor-readable storage media of clause 16, wherein, prior to the detection of the failure, the predefined memory portion includes a first copy of data to which the first storage processor is connected and a second copy of data to which the second storage processor is connected, the second copy of data generated as a processing resilience duplicate of the first copy of data.

Clause 18. The one or more tangible processor-readable storage media of clause 17, wherein the failure of the first storage processor interrupted management of data operations on the first copy of data, and responsive to the detection of the failure, the connection between the second storage processor and the second copy of data is maintained to enable the second storage processor to resume the management of data operations on the second copy of data.

Clause 19. The one or more tangible processor-readable storage media of clause 17, wherein, prior to the detection of the failure, the predefined memory portion comprises: a portion of data to which the first storage processor is connected; and recent operation data representing a predefined number of recent operations associated with the portion of data, the recent operation data connected to the second storage processor.

Clause 20. The one or more tangible processor-readable storage media of clause 19, the process further comprising: reconciling, responsive to the detection of the failure, the portion of data with the recent operation data.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein may be implemented as logical steps in one or more computer systems. The logical operations may be implemented (1) as a sequence of processor-implemented steps executing in one or more computer systems or (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination. Other implementations are within the scope of the following claims. Nevertheless, it will be understood that various modifications can be made without departing from the spirit and scope of the recited claims.

What is claimed is:

1. A method for managing access to stored data in a storage system, comprising:
    assigning a first storage processor as a leader storage processor and a second storage processor as a follower storage processor, wherein the leader storage processor is configured to manage data storage operations on a predefined memory portion of the storage system, and the follower storage processor is configured to manage data storage operations in response to a failure of the leader storage processor;
    detecting a failure of the first storage processor that interrupts management of the data storage operations by the first storage processor, wherein, prior to the detection of the failure of the first storage processor, the predefined memory portion includes a first copy of data to which the first storage processor is connected and a second copy of data to which the second storage processor is connected, the second copy of data generated as a processing resilience duplicate of the first copy of data; and
    assigning, responsive to detection of the failure of the first storage processor, the second storage processor as a new leader storage processor configured to resume the management of the data storage operations on the predefined memory portion and a third storage processor as a new follower storage processor configured to manage the data storage operations on the predefined memory portion in response to a failure of the new leader storage processor, wherein assigning the third storage processor as the new follower storage processor includes connecting the third storage processor to the predefined memory portion.

2. The method for managing access to stored data of claim 1, wherein, responsive to the detection of the failure of the first storage processor, connection between the second storage processor and the second copy of data is maintained to enable the second storage processor to process operations on the second copy of data.

3. The method for managing access to stored data of claim 1, wherein connecting the third storage processor to the predefined memory portion comprises:
    connecting the third storage processor to the first copy of data to enable the third storage processor to operate as the new follower storage processor with respect to the first copy of data by adding a reference directed to the first copy of data to a directory associated with the third storage processor.

4. The method for managing access to stored data of claim 1, wherein assigning the third storage processor as the new follower storage processor further comprises:
    modifying descriptive data associated in memory with the third storage processor to represent that the third storage processor is the new follower storage processor.

5. The method for managing access to stored data of claim 1, wherein the first storage processor, the second storage processor, and the third storage processor are elements of a cluster and are mounted to the storage system.

6. The method for managing access to stored data of claim 5, wherein no element of the cluster instructs the storage system to generate a complete processing resilience duplicate of data stored in the predefined memory portion, based on the detection of the failure.

7. A system for managing access to stored data in a storage system, comprising:
    one or more hardware processing units;
    a first storage processor executable by the one or more hardware processing units and assigned as a leader storage processor configured to manage data storage operations on a predefined memory portion of the storage system;
    a second storage processor executable by the one or more hardware processing units and assigned as a follower storage processor configured to resume management of data storage operations on the predefined memory portion in response to failure of the leader storage processor;

a third storage processor executable by the one or more hardware processing units, wherein the second storage processor and the third storage processor are mounted to the storage system; and a controller storage processor executable by the one or more hardware processing units and configured to:
  detect a failure of the first storage processor that interrupts management of data storage operations by the first storage processor;
  assign, responsive to detection of the failure of the first storage processor, the second storage processor as a new leader storage processor configured to resume the management of data storage operations on the predefined memory portion; and
  assign the third storage processor as a new follower processor to manage the data storage operations on the predefined memory portion in response to a failure of the new leader storage processor, wherein assignment of the third storage processor as a new follower storage processor includes connecting the third storage processor to the predefined memory portion.

8. The system for managing access to stored data in a storage system of claim 7, wherein, prior to the detection of the failure of the first storage processor, the predefined memory portion comprises:
  a portion of data to which the first storage processor is connected; and
  recent operation data representing a predefined portion of recent operations associated with the portion of data, the recent operation data connected to the second storage processor.

9. The system for managing access to stored data in a storage system of claim 8, wherein the controller storage processor is further configured to reconcile the portion of data with the recent operation data.

10. The system for managing access to stored data in a storage system of claim 8, wherein the controller storage processor is further configured to instruct the third storage processor to connect with new recent operation data stored in the predefined portion of memory, the new recent operation data representing the predefined portion of new recent operations associated with the portion of data generated by the second storage processor after the detection of the failure of the first storage processor.

11. The system for managing access to stored data in a storage system of claim 7, wherein the first storage processor, the second storage processor, and the third storage processor are elements of a processing cluster.

12. The system for managing access to stored data in a storage system of claim 11, wherein no element of the processing cluster is configured to instruct the storage system to generate a further processing resilience duplicate of data stored in the predefined memory portion in response to the detection of the failure of the first storage processor.

13. The system for managing access to stored data in a storage system of claim 7, wherein the controller storage processor is configured to assign the third storage processor as the new follower storage processor by at least modifying descriptive data associated with the third storage processor to represent an assignment of the third storage processor as the new follower storage processor of the predefined memory portion.

14. One or more tangible processor-readable storage media embodied with instructions for executing on one or more processors and circuits of a computing device a process for managing access to stored data, the process comprising:
  detecting a failure of a first storage processor assigned as a leader storage processor configured to manage data operations on a predefined memory portion of a storage system;
  assigning, based on detection of the failure, a second storage processor as the leader storage processor, wherein the second storage processor was assigned as a follower storage processor connected to the predefined memory portion prior to the detection of the failure; and
  assigning, based on the detection of the failure, a third storage processor as the follower storage processor by connecting the third storage processor to the predefined memory portion.

15. The one or more tangible processor-readable storage media of claim 14, wherein the second storage processor, and the third storage processor are mounted to the storage system.

16. The one or more tangible processor-readable storage media of claim 15, wherein, prior to the detection of the failure, the predefined memory portion includes a first copy of data to which the first storage processor is connected and a second copy of data to which the second storage processor is connected, the second copy of data generated as a processing resilience duplicate of the first copy of data.

17. The one or more tangible processor-readable storage media of claim 16, wherein the failure of the first storage processor interrupted management of data operations on the first copy of data, and responsive to the detection of the failure, the connection between the second storage processor and the second copy of data is maintained to enable the second storage processor to resume the management of data operations on the second copy of data.

18. The one or more tangible processor-readable storage media of claim 16, wherein, prior to the detection of the failure, the predefined memory portion comprises:
  a portion of data to which the first storage processor is connected; and
  recent operation data representing a predefined number of recent operations associated with the portion of data, the recent operation data connected to the second storage processor.

19. The one or more tangible processor-readable storage media of claim 18, the process further comprising:
  reconciling, responsive to the detection of the failure, the portion of data with the recent operation data.

* * * * *